(12) United States Patent
Mochizuki

(10) Patent No.: US 9,776,271 B2
(45) Date of Patent: Oct. 3, 2017

(54) DESOLDERING TOOL NOZZLE AND METHOD OF MANUFACTURING THE NOZZLE

(71) Applicant: Hakko Corporation, Osaka (JP)

(72) Inventor: Toshikazu Mochizuki, Osaka (JP)

(73) Assignee: Hakko Corporation (JP)

( * ) Notice: Subject to any disclaimer, the term of this patent is extended or adjusted under 35 U.S.C. 154(b) by 0 days.

(21) Appl. No.: 14/943,933

(22) Filed: Nov. 17, 2015

(65) Prior Publication Data

US 2016/0175958 A1    Jun. 23, 2016

Related U.S. Application Data

(60) Provisional application No. 62/094,694, filed on Dec. 19, 2014.

(30) Foreign Application Priority Data

Jul. 23, 2015 (JP) ................. 2015-146168

(51) Int. Cl.
*B23K 31/02* (2006.01)
*B23K 1/018* (2006.01)

(52) U.S. Cl.
CPC .................... *B23K 1/018* (2013.01)

(58) Field of Classification Search
CPC ........ B23K 1/018; B23K 3/029; B23K 1/006; B23K 3/00
USPC .............. 228/191, 119, 264, 19–20.5, 51–55
See application file for complete search history.

(56) References Cited

U.S. PATENT DOCUMENTS

| | | | | | |
|---|---|---|---|---|---|
| 3,003,049 A | * | 10/1961 | Thomas | ............... | B23K 3/0615 219/230 |
| 3,484,033 A | * | 12/1969 | Sachs | ..................... | B23K 1/018 15/341 |
| 3,881,087 A | * | 4/1975 | Nicosia | ................ | B23K 3/0315 219/230 |
| 4,187,972 A | * | 2/1980 | Vella | ..................... | B23K 1/018 219/238 |
| 4,204,299 A | * | 5/1980 | Fortune | .................. | B23K 1/018 15/341 |
| 4,206,864 A | * | 6/1980 | Rauchwerger | ......... | B23K 1/018 15/341 |
| 4,328,920 A | * | 5/1982 | Vella | ..................... | B23K 1/018 219/230 |
| 4,424,930 A | * | 1/1984 | Wilhelmson | ........... | B23K 3/025 205/118 |
| 4,560,101 A | * | 12/1985 | Wilhelmson | ........... | B23K 1/018 228/54 |

(Continued)

FOREIGN PATENT DOCUMENTS

JP    B 19955045103    5/1995

*Primary Examiner* — Kiley Stoner
(74) *Attorney, Agent, or Firm* — David B. Abel

(57) ABSTRACT

The object of the invention is to provide a nozzle for a desoldering tool that facilitates the removal of solder from components having a large difference between the width and thickness dimensions of the solder connection. The present application discloses a nozzle for use with a desoldering tool for melting and sucking solder away. The nozzle includes a distal end surface which is heated to a temperature melting the solder. The distal end surface, as an upstream end of a molten solder suction path, defines a non-circular elongated generally oval shaped opening.

23 Claims, 21 Drawing Sheets

(56) References Cited

U.S. PATENT DOCUMENTS

| | | | | |
|---|---|---|---|---|
| 4,602,144 A | * | 7/1986 | Vogel | B23K 1/018 |
| | | | | 219/230 |
| 4,686,737 A | * | 8/1987 | Fortune | B23K 1/018 |
| | | | | 15/341 |
| 4,919,322 A | * | 4/1990 | Fortune | A61B 17/50 |
| | | | | 222/570 |
| 4,997,121 A | | 3/1991 | Yoshimura | |
| 5,280,668 A | * | 1/1994 | Fortune | A47L 5/24 |
| | | | | 15/341 |
| 5,810,241 A | * | 9/1998 | Gabriel | B23K 1/012 |
| | | | | 228/49.5 |
| 6,147,325 A | * | 11/2000 | Eisele | B23K 3/025 |
| | | | | 219/229 |

\* cited by examiner

DESOLDERING TOOL NOZZLE AND METHOD OF MANUFACTURING THE NOZZLE

FIELD OF THE INVENTION

The invention relates to a nozzle used in a desoldering device that sucks solder, and the method of manufacturing such nozzle.

BACKGROUND OF THE INVENTION

Desoldering devices melt the solder connecting a printed circuit board ("PCB") and electronic components. Desoldering devices suck the molten solder, and enable a user to take off the electronic component from the PCB. Prior art documents JP Utility model published S48-59722 A; JP Utility model published H3-18959 A and its corresponding U.S. Pat. No. 4,997,121, and JP patent published 2004-154801A all disclose various desoldering devices.

JP Utility model H3-18959A, and its corresponding U.S. Pat. No. 4,997,121, discloses a method for taking off electronic components from the PCB whereby the operator inserts the lead wire into the circular opening of the nozzle of the desoldering tool. Since the nozzle of the desoldering tool is heated, the solder surrounding the lead wire is sufficiently melted. Consequently, the operator can easily take off the electronic components from the PCB.

JP Utility model published S48-59722 A does not have a corresponding U.S. Application or patent. JP 2004454801 A does not have a corresponding U.S. Application or patent.

SUMMARY OF THE INVENTION

The technique to desolder and take off a component disclosed in U.S. Pat. No. 4,997,121 is suitably applicable for the work having a cross section of circular or regular polygonal shape, for example, a lead wire. However, the technique disclosed therein is unsuitable for terminal components having a large difference between the width and thickness dimensions, for example, flat terminals. If an operator uses the technique disclosed in U.S. Pat. No. 4,997,121, inserting the flat terminal into the nozzle to melt the solder in the periphery of the flat terminal, the flat terminal will have a section remote from the nozzle and section near from the nozzle. For this reason, the heat is not transmitted uniformly, and the solder will not sufficiently melt, and the operator would fail to take off the flat terminal from the PCB.

The present invention aims to provide a technique relating to a nozzle that facilitates solder removal from components having a large difference between the width and thickness dimensions of the soldered component.

A nozzle according to one aspect of the present invention is used in a desoldering tool for melting and sucking away solder. The nozzle includes a distal end surface which is heated to a temperature which melts the solder. The distal end surface, as an upstream end of a molten solder suction path, defines a non-circular opening.

According to the above described configuration, the distal end surface of the nozzle defines a non-circular opening as an upstream end of the Molten solder suction path, so the worker is able to easily remove solder from a soldered component having large difference between the width and the thickness.

In the above structure, the nozzle may further comprise a nozzle end member including a distal end ring which forms said distal end surface and an insertion body extending from said distal end ring, and a nozzle base formed with a hollow-opening in which said insertion body is inserted. Said nozzle base may have a higher thermal conductivity than the nozzle end member. The nozzle end member may have a higher corrosion/erosion resistance than the nozzle base with respect to solder.

According to the above structure, the nozzle base has a higher thermal conductivity than the nozzle end member whereby the distal end surface is efficiently heated. The nozzle end member has a higher corrosion/erosion resistance than the nozzle base, accordingly the nozzle is less likely to corrode or erode with exposure to solder and heat cycling.

In the above configuration, the insertion body may include a proximal end portion on the opposite side of the distal end ring. The proximal end portion may define a proximal end circular ring shape to ease connection to a tubular member. The proximal end circular ring preferable has a diameter greater than the width but less than the length of the non-circular opening.

According to the above construction, since the proximal end portion of the insertion body defines a proximal end circular ring, the proximal end portion of the insertion body is easily connected to other tubular members.

In the above configuration, the opening may have a first dimension length measured on a first straight line passing through the center of the opening, and a second dimension width measured on a second line perpendicular to the first straight line in said center, the second dimension width being smaller than the first dimension length.

According to the above construction, an opening formed on the distal end surface has a first dimension length measured along a first straight line crossing the center of the opening, has a second dimension width shorter than the first dimension length measured along a second straight line that is perpendicular to the first straight line at the center. Therefore, the operator can easily remove solder from a part having a large difference between the width and length dimensions.

In the above configuration, the distal end surface may comprise an inner edge that defines the opening. The inner edge may include a pair of straight edges extending along a first straight line and spaced apart by the second dimension width, and a pair of curved edges which are curved so as to connect the end of the pair of straight edges.

According to the above construction, the inner edge defining the opening includes a pair of straight sides extending along a first straight line and spaced apart defining the width, and a pair of curved ends which are curved so as to connect the end of the pair of straight edges. With this configuration, the operator can insert the component terminal having a large difference between the width and thickness dimensions into the opening of the nozzle, and easily remove the solder.

In the above configuration, the curved edges may be curved in a direction away from the center.

According to the above configuration, the curved edges are curved in a direction away from the center, so the operator may insert the component terminal having a large difference between the width and thickness dimension into the opening, and easily remove solder.

In the above configuration, the desoldering tool includes a heater, a heating core heated by the heater, a tubular body extending from the heating core, and a vacuum device for reducing the internal pressure of the tubular body. A nozzle base may be connected to the heating core. The proximal end portion may be connected to the tubular body.

According to the above structure, the nozzle base is suitably heated because it is connected to the heating core heated by the heater. The nozzle base has a high thermal conductivity, whereby heat of the heater is efficiently transferred to the nozzle end member. The proximal end portion is connected to a tubular body extending from the heating core, so solder is sucked away properly by the desoldering tool.

In the above structure, the nozzle may further comprise a heater for heating the nozzle base.

According to the above structure, the nozzle base is suitably heated because it is connected to the heating core heated by the heater. Since the nozzle base has a high thermal conductivity, heat of the heater is efficiently transferred to the nozzle end member.

A manufacturing method according to another aspect of the present invention can be utilized to form the nozzle of the present invention used in the desoldering tool sucking away solder. The manufacturing method includes a step of providing a nozzle having a distal end surface having a circular opening formed therein, and a step to press the distal end surface and deforming the circular opening to the non-circular opening.

According to the above configuration, the circular opening formed on the distal end surface of the nozzle is deformed into a non-circular shape, so the manufacturer may manufacture a nozzle suitable for removing solder to take off components having a large difference between the width and thickness dimensions.

In the above structure, the step of providing said nozzle may include: (i) a step to form a nozzle end member by processing a first material, having a distal end portion forming said distal end surface and an insertion body extending from said distal end portion; (ii) a step to insert said insertion body into a nozzle base, the nozzle base formed from a second material having higher thermal conductivity than the first material of the nozzle member, the nozzle base material also having lower anti-corrosivity/erosivity than the first material of the nozzle end member.

According to the above structure, the nozzle base has a higher thermal conductivity than the nozzle end member, so the distal end surface is efficiently heated. The nozzle end member has a higher corrosion resistance with respect to solder than the nozzle base, so the resulting composite nozzle is less likely to corrode or erode.

In the above structure, the step of providing said nozzle may include drilling or milling a hole penetrating the distal end portion and the insertion body forming the circular opening.

According to the above described structure, the suction path for sucking the solder is easily formed in the nozzle.

In the above described structure, the step of pressing the distal end surface may include the step of pressing the distal end portion and a part of the insertion body together.

According to the above configuration, the distal end portion and a part of the insertion body is pressed together, so the non-circular opening is easily formed on the distal end surface. Meanwhile, the remaining portion of the insertion body maintains a circular cross-section proximal end circular ring and opening, and the insertion body is easily connected to other tubular members.

In the above described structure, the steps of fabricating the nozzle may include the step of brazing or chemically bonding the distal end portion and the insertion body to the nozzle base.

According to the above described configuration, the distal end portion and the insertion body is brazed to the nozzle base, so the nozzle end member is rigidly attached to the nozzle base.

In the above described structure, the manufacturing method may further comprise the step of forming a corrosion/erosion resistant layer on the surface of the nozzle base.

According to the above described configuration, since the manufacturing method includes the step of forming a corrosion/erosion resistant layer on the surface of the nozzle base, the nozzle will be less likely to corrode or erode.

A nozzle obtained by the techniques described above can facilitate solder removal from component terminals having a large difference between the width and thickness dimensions.

DETAIL DESCRIPTION OF THE INVENTION

The inventors have identified a problem in that conventional desoldering tool nozzles are unsuitable for solder removal from component terminals having a large difference between the width and thickness dimensions. A first embodiment of the present invention addresses the problem and describes a nozzle that facilitates solder removal from the component terminal having a large difference between the width and thickness dimensions.

Figure 1:
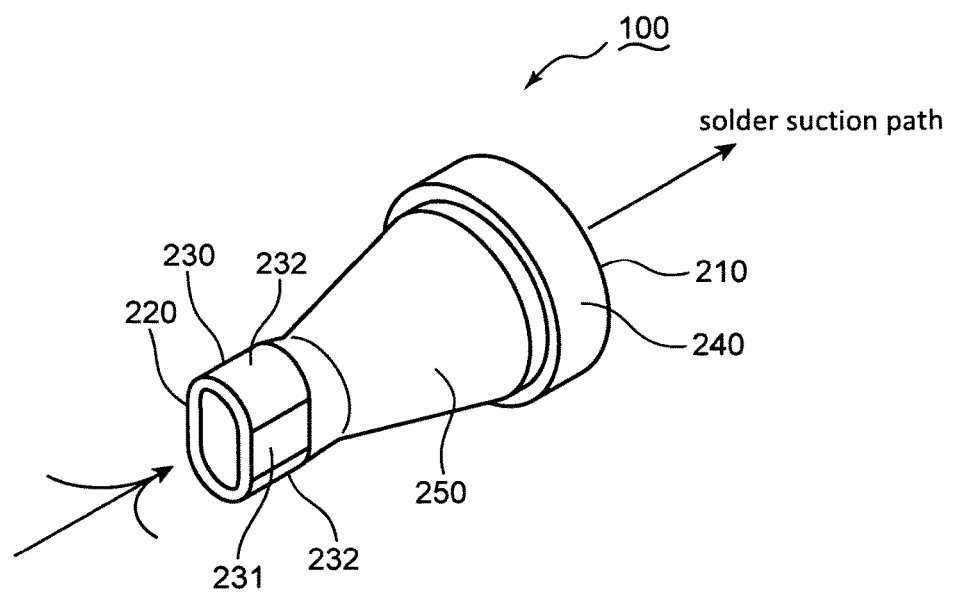
FIG. 1 is a schematic perspective view of a nozzle of the first embodiment.

FIG. 1 is a schematic perspective view of a nozzle 100 of the first embodiment. Referring to FIG. 1, the nozzle 100 and the method of its manufacture is described in greater detail below.

Nozzle 100 is used with a desoldering tool and system (not shown) for melting and sucking the solder. Nozzle 100 is configured so that it may be heated to a temperature capable of melting the solder by the desoldering tool and desoldering system.

Nozzle 100 may be formed from a metallic material having a high thermal conductivity. In addition, the metallic material selected for the nozzle will have a have a high corrosion/erosion resistance against solder including the flux materials used with the solder. The principle of this first embodiment is not limited to a specific material used as the nozzle 100.

Nozzle 100 includes a proximal end surface 210, and a distal end surface 220. Proximal end surface 210 is substantially circular. Distal end surface 220 opposite of the proximal end surface 210 is non-circular.

A worker using the nozzle 100 for removing the solder will make the distal end surface 220 that is sufficiently heated to melt the solder to contact solder, and melt the solder. Nozzle 100, between the proximal end surface 210 and the distal end surface 220, defines a suction path which the molten solder passes through. Molten solder is sucked from the distal end surface 220 toward the proximal end surface 210 through the suction path.

Figure 2:
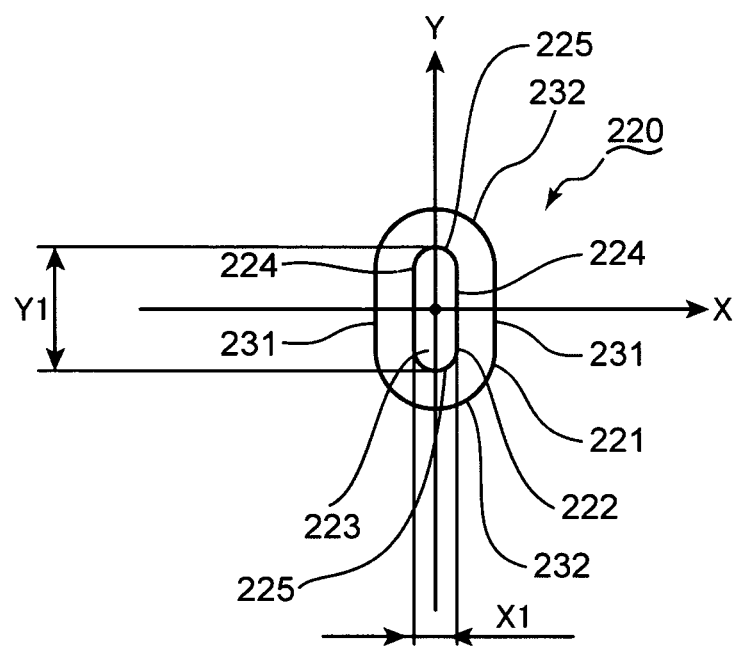
FIG. 2 is a schematic view of the distal end surface of the nozzle shown in FIG. 1.

FIG. 2 is a schematic view of the distal end surface 220. Referring to FIGS. 1 and 2, the distal end surface 220 is described in further detail below.

As shown in FIG. 2, the distal end surface 220 includes an outer edge 221 and an inner edge 222. Outer edge 221 defines the outside shape of the distal end surface 220. The inner edge 222 defines a non-circular shape of the opening 223 formed in the distal end surface 220. Opening 223 is the upstream end of the solder suction path described with reference to FIG. 1.

FIG. 2 shows a conceptual-defined X-Y coordinates on the distal end surface 220. Origin of the X-Y coordinates is the center of the opening 223. The X-axis is orthogonal to the Y axis at the coordinate origin.

The inner edge 222 includes two straight line sides 224, and two arcuate sides 225. The two straight line sides 224 are perpendicular to the X axis. FIG. 2 depicts the distance between the two straight line sides 224 extending along the Y-axis, using the symbol "X1" defining the width. The two arcuate sides 225 are both curved in a direction away from the coordinate origin. One of the two arcuate sides 225, connects the top end of the two straight line sides 224. The other one of the two arcuate sides 225 connects the bottom ends of the two straight line sides 224. FIG. 2 describes the distance between the two arcuate sides 225 on the Y-axis using the symbol "Y1" defining the length. Distance "X1" is shorter than distance "Y1". Thus, the opening 223, overall, forms a generally elliptical or flattened oval shape. The outer edge 221 is substantially an elliptical or flattened oval shape which is similar in shape to the opening 223. In the present embodiment, the first dimension length is exemplified by the distance "Y1". The second dimension width is exemplified by the distance "X1.". The straight edge is exemplified by the straight line sides 224. The curved edge is exemplified by the two arcuate sides 225.

Figure 3:
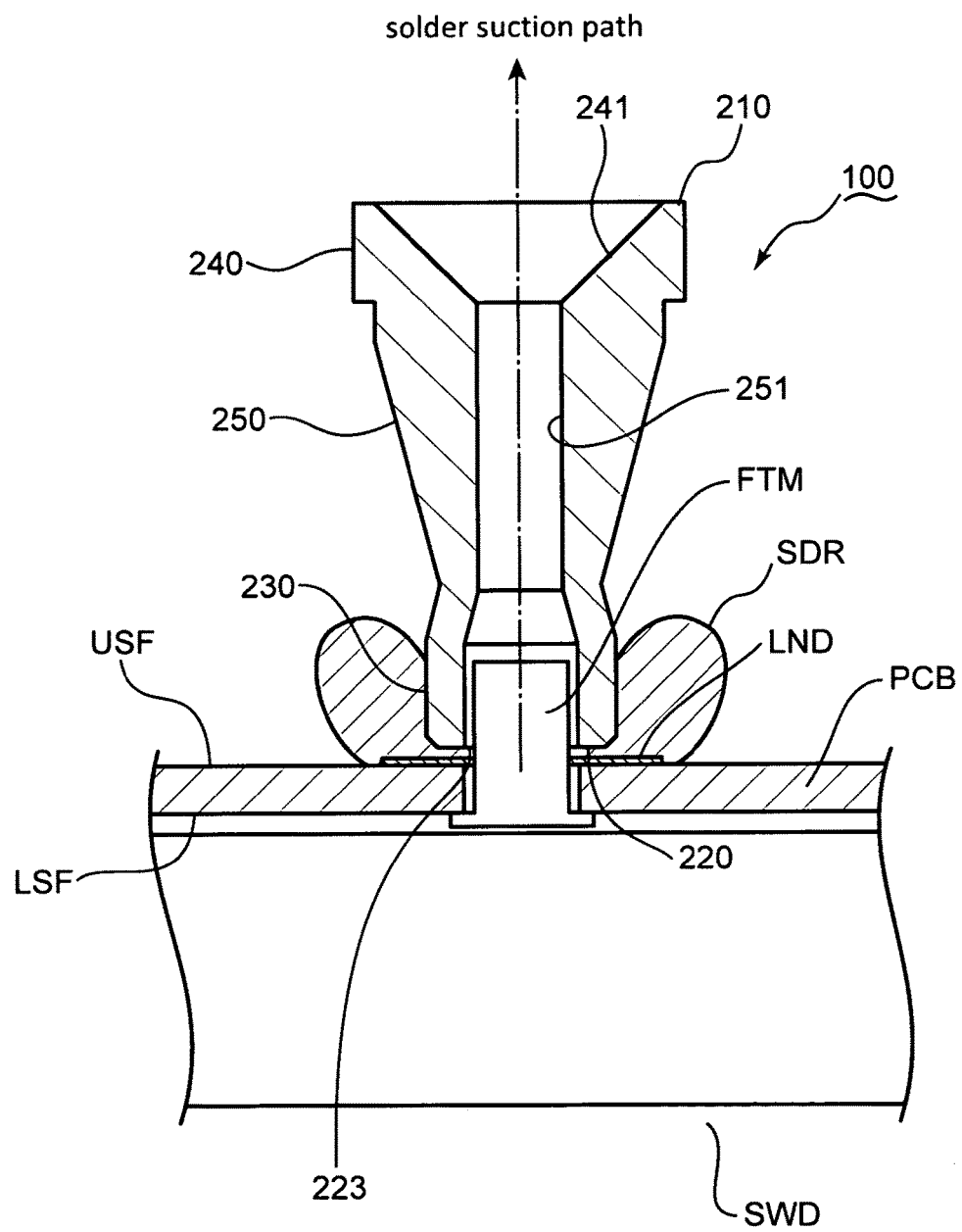
FIG. 3 is a schematic cross-sectional view of a nozzle shown in FIG. 1

FIG. 3 is a schematic cross-sectional view of the nozzle 100. Referring to FIGS. 2 and 3, an exemplary use of the nozzle 100 is described below.

FIG. 3 shows a printed circuit board PCB, and a switching element SWD. Switching element SWD is fixed to the printed circuit board PCB by solder SDR. Printed circuit board PCB includes a bottom or lower surface LSF, and top or upper surface USF, and the land LND. The switching element SWD includes a flat terminal FTM that penetrate from the bottom surface LSF to the top surface USF.

Flat terminals FTM generally have a cross-section substantially rectangular. Lands LND formed on the top surface USF has elliptical/oval shape surrounding the flat terminal FTM protruding from the top surface USF. The solder SDR is on the land LND fixing the flat terminals FTM to printed circuit board PCB.

As shown in FIG. 3, when the user inserts the flat terminal FTM protruding from the top surface USF into the nozzle opening 223, the distal end surface 220 will be in contact with or close to the land LND. Straight line sides 224 (see FIG. 2) are close to the long side of the rectangular cross section of the flat terminal FTM. In this case, the arcuate sides 225 (see FIG. 2) are close to the short sides of the rectangular cross section of the flat pin FTM. Solder SDR fixing the flat terminal FTM is properly melted and removed by the suction of the desoldering tool. Consequently, the user may easily remove the switching element SWD from the printed circuit board PCB.

Nozzles of the first embodiment may be formed by casting or machining. In this case, an opening formed in the end of the nozzle may be made of various non-circular shapes. However, a nozzle having an opening of generally elliptical shape, which is described in connection with the first embodiment, can be utilized on a number of terminals which require solder removal. The inventors found that the opening of substantially elliptical shape is easily formed by the pressing process. In a second embodiment, a manufacturing method of a nozzle having an opening of generally elliptical shape is explained.

Figure 4:
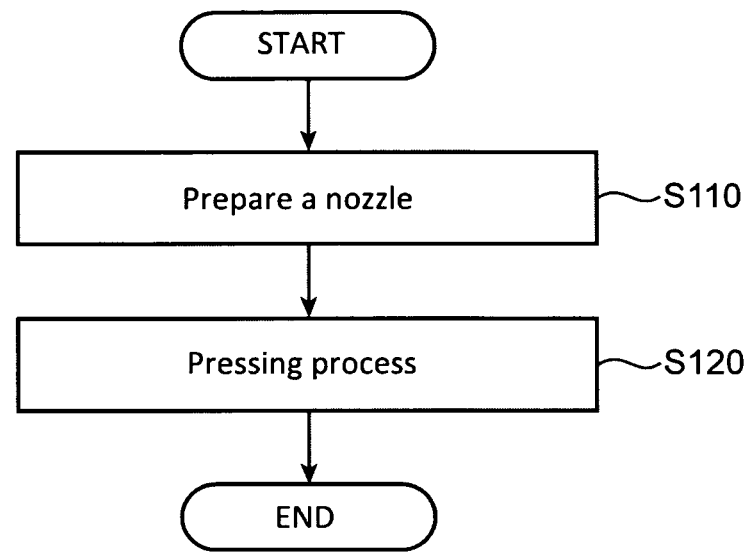
FIG. 4 is a schematic flow chart illustrating an exemplary method of manufacturing the nozzle shown in FIG. 1.
Figure 5:
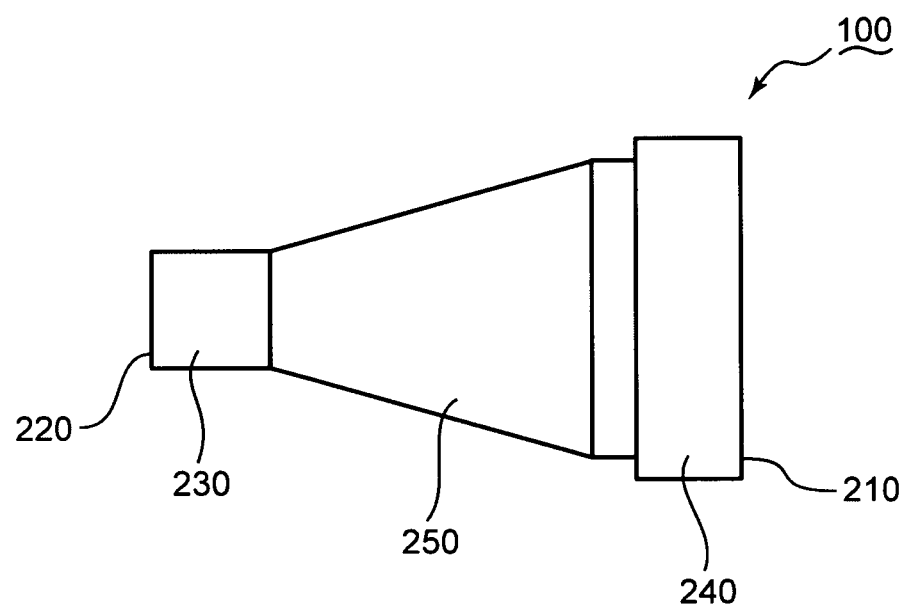
FIG. 5 is a schematic side view of a nozzle used in the manufacturing method shown in FIG. 4, before the pressing step.

FIG. 4 is a schematic flowchart representing an exemplary method of manufacturing the nozzle 100. FIG. 5 is a schematic side view of the nozzle 100 before a pressing process. Referring to FIG. 1 through 5, a manufacturing method of the nozzle 100 is described below.

In a first step 110, a nozzle blank having a circular opening on the distal end surface 220 is formed from a suitable metallic material. The nozzle blank may be formed by a machining process from tubular or cast material. Alternatively, the nozzle blank may be formed by casting. The principle of this embodiment is not limited to the specific way of obtaining the nozzle blank.

FIG. 5 shows a nozzle blank 100 obtained in step 110, before pressing processing. As shown in FIG. 5, the nozzle blank 100 includes a distal barrel portion 230, a proximal barrel portion 240, and a tapered barrel portion 250.

Distal barrel portion 230 includes a distal end surface 220. In step 110, the opening formed in the distal end surface 220 (not shown) is substantially circular.

Proximal barrel portion 240 is thicker than the distal barrel portion 230. Proximal barrel portion 240 includes a proximal end surface 210. As shown in FIG. 3, the proximal barrel portion 240 further includes a tapered inner surface 241. Tapered inner surface 241 defines a tapered space narrowing toward the distal end surface 220. A heater core (not shown) of the desoldering tool (not shown) will be inserted into the tapered space when the nozzle is attached to a desoldering tool. Tapered inner surface 241 is inclined with respect to the central axis of the nozzle 100, so the contact area between the tapered inner surface 241 and the heater core heated by the heater is widened. Therefore, the heat transfer efficiency from the heating core to the nozzle 100 is increased.

The tapered barrel portion 250 of the nozzle blank is located between the distal barrel portion 230 and the proximal barrel portion 240. The outer shape of the tapered barrel portion 250 narrows from the proximal barrel portion 240 toward to the distal barrel portion 230. Thus, as the shape of the distal end surface 220 will be close to the land or work to be desoldered (not shown), the amount of heat received from the heater core increases at the proximal barrel portion 240. Also, the user that performs desoldering operation can easily see the distal barrel portion 230. As shown in FIG. 3, the tapered barrel portion 250 at least partially includes an inner wall 251 defining a straight tubular path.

At step 120, the manufacturer at least partially presses the distal barrel portion 230 of the nozzle blank 100 shown in FIG. 5. Consequently, the outer peripheral surface of the distal barrel portion 230 would include flat surfaces 231 and curved surfaces 232 (see FIG. 1). At the same time, the inner edge 222 (see FIG. 2) of the distal end surface 220, will include the straight line sides 224 (see FIG. 2) and the arcuate sides 225 (see FIG. 2). The substantially circular opening is thereby deformed into a non-circular opening 223 (see FIG. 2).

The pressing amount may be determined to adapt to the cross section of the terminal to be worked using the nozzle 100. For example, the amount of the pressing may be determined so that the length "Y1" (see FIG. 2) will be more than twice the width "X1".

According to the method described in connection with the present embodiment, the manufacturer can make the nozzle 100 simply and in a repeatable manner.

The inventors have developed a suitable jig for pressing the nozzle blank 100. In a third embodiment, the pressing step using a jig will be described.

Figure 6A:
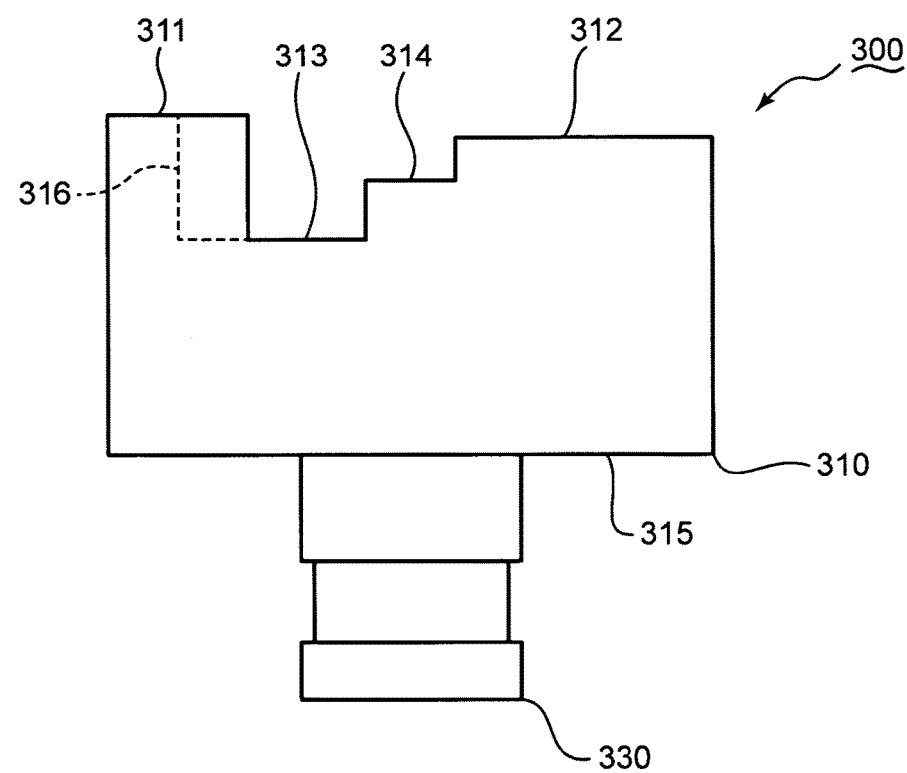
FIG. 6A is a schematic plan view of the jig which may be in use with the manufacturing method shown in FIG. 4.
Figure 6B:
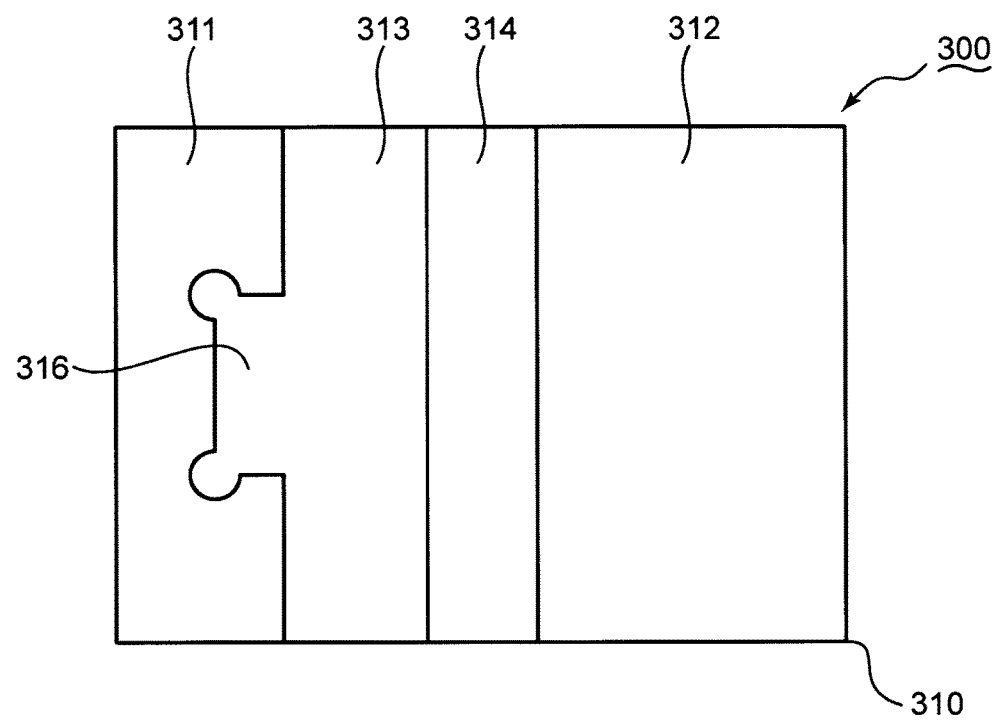
FIG. 6B is a schematic front view of the jig shown in FIG. 6A.

FIG. 6A is a schematic plan view of the jig 300. FIG. 6B is a schematic front view of the jig 300. Referring to FIGS. 6A and 6B, the jig 300 is described below.

As shown in FIG. 6A, the jig 300 includes a holding block 310 and a fixing leg 330. Holding block 310 is used to hold the nozzle blank described with reference to FIG. 5. Fixing leg 330 is used for fixing the jig to the pressing machine (not shown).

As shown in FIG. 6A, the holding block 310 includes a first top surface 311, a second top surface 312, a third top surface 313, a fourth top surface 314, a flat bottom surface 315. The third top surface 313 and the fourth top surface 314 are located between the first top surface 311 and the second top surface 312. The third top surface 313 is located between the first top surface 311 and the fourth top surface 314. Fourth top surface 314 is located between the second top surface 312 and the third top surface 313. The width of the fourth top surface 314 which is defined as the distance between the second top surface 312 and the third top surface 313, substantially coincides with the length of the distal barrel portion 230.

The bottom surface 315 is substantially parallel to the first top surface 311, the second top surface 312, the third top surface 313, and the fourth surface 314, respectively. The distance from the bottom surface 315 to the first top surface 311 is longer than the distance from the bottom surface 315 to the second top surface 312, and is substantially equal to the diameter of the proximal barrel portion 240. The distance from the bottom surface 315 to the second top surface 312 is longer than the distance from the bottom surface 315 to the fourth top surface 314. The distance from the bottom surface 315 to the fourth top surface 314 is longer than the distance from the bottom surface 315 to the third top surface 313. As shown in FIG. 6B, on the first top surface 311, a cut 316 is formed. The distance difference from the bottom surface 315 to the second top surface 312 and the fourth top surface 314 is a factor determining the pressing amount of the distal barrel portion 230.

Figure 7A:
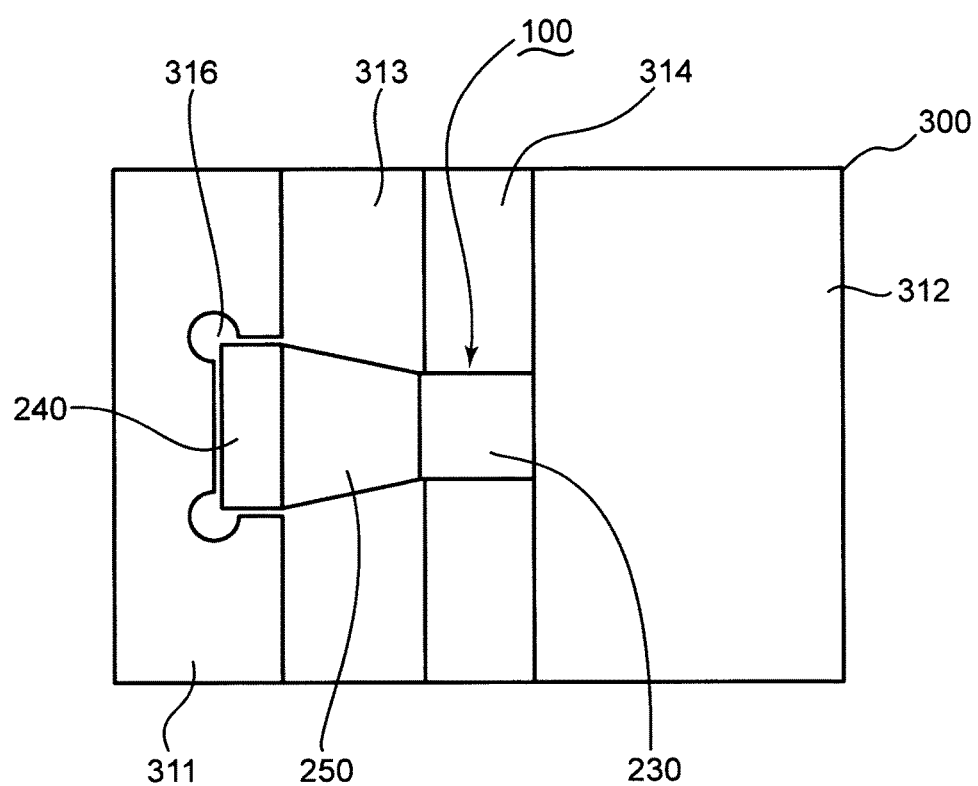
FIG. 7A is a schematic plan view of a nozzle attached to the jig shown in FIG. 6A.
Figure 7B:
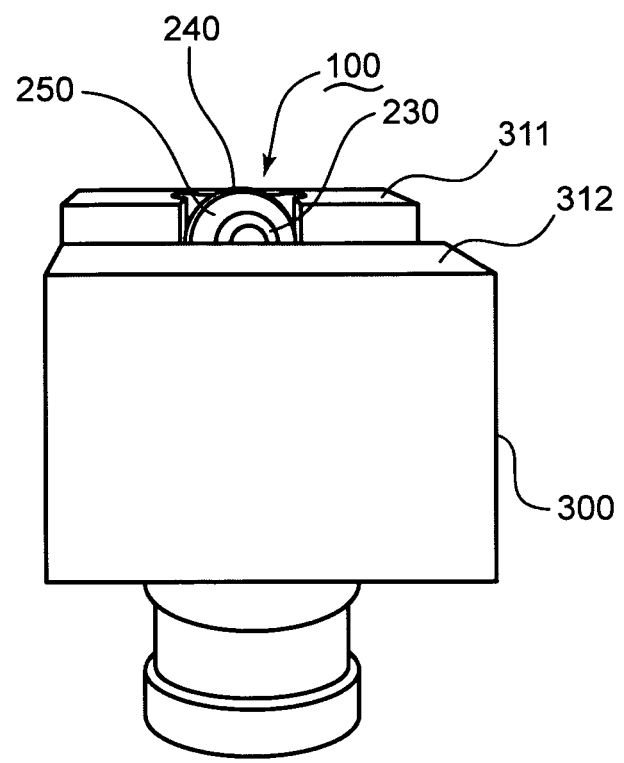
FIG. 7B is a schematic perspective view of a nozzle attached to the jig shown in FIG. 6A.

FIG. 7A is a schematic plan view of a nozzle blank mounted to the jig 300. FIG. 7B is a schematic perspective view of a nozzle blank mounted to the jig 300. The pressing process using a jig will be described with reference to FIGS. 4, 5, 7A and 7B.

Proximal barrel portion 240 of a nozzle blank, before the pressing process, described with reference to FIG. 5 is mounted to the cut portion 316 of the jig 300 (see FIG. 7A). At this time, the distal barrel portion 230 of the nozzle blank is supported by the fourth top surface 314. Tapered barrel portion 250 of the nozzle blank is positioned above the third top surface 313.

As shown in FIG. 7B, the distal barrel portion 230 projects from the second top surface 312. The pressing amount in the step 120 described with reference to FIG. 4 is determined by the amount of projection of the distal barrel portion 230 from the second top surface 312.

Figure 8:
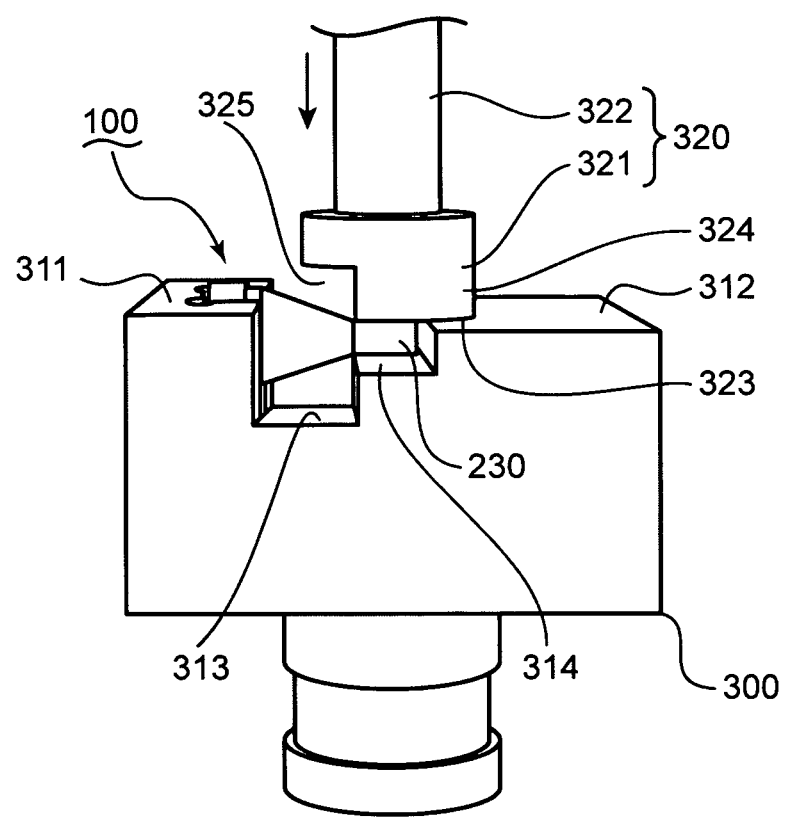
FIG. 8 is a schematic view of the pressing process of the manufacturing method shown in FIG. 4.

FIG. 8 is a schematic view of the pressing step, step 120 in FIG. 4. Referring to FIG. 8, the pressing process is explained.

A nozzle blank mounted to the jig 300 is placed below the pressing rod 320 of the pressing machine. Pressing rod 320 includes a substantially cylindrical pressing board 321 and a rod 322. Pressing board 321 is formed at the lower end of the rod 322.

Pressing board 321 includes a flat bottom surface 323 and an outer peripheral surface 324 extending upwardly from the bottom surface 323. A notch 325 is formed on the outer peripheral surface 324. Therefore, the bottom surface 323 forms an arch-like shape.

The jig 300 is positioned so the distal barrel portion 230 of the nozzle blank is positioned below the bottom surface 323 of the pressing board 321, and the tapered barrel portion 250 of the nozzle blank is located below the notch 325. Therefore, when the pressing rod 320 is lowered down, the distal barrel portion 230 is selectively pressed. When the bottom surface 323 of the pressing board 321 abuts the second upper surface 312 of the holding block 300, the descent of the pressing rod 320 is stopped. Therefore, the nozzle blank avoids over-pressing.

Since the fourth top surface 314 of the jig 300 and the bottom surface 323 of the pressing board 321 of the push rod 320 are flat, flat surface 231 (see FIG. 1) is formed in the distal barrel portion 230. Alternatively, the pressing surface of the pressing member for pressing the distal barrel portion 230, may be curved. In this case, the distal barrel portion 230 will have a periphery contour that is generally curved or an elongated oval.

The nozzles described in connection with the first to third embodiments, could be used with various desoldering devices. In the fourth embodiment, the exemplary desoldering devices are described.

Figure 9:
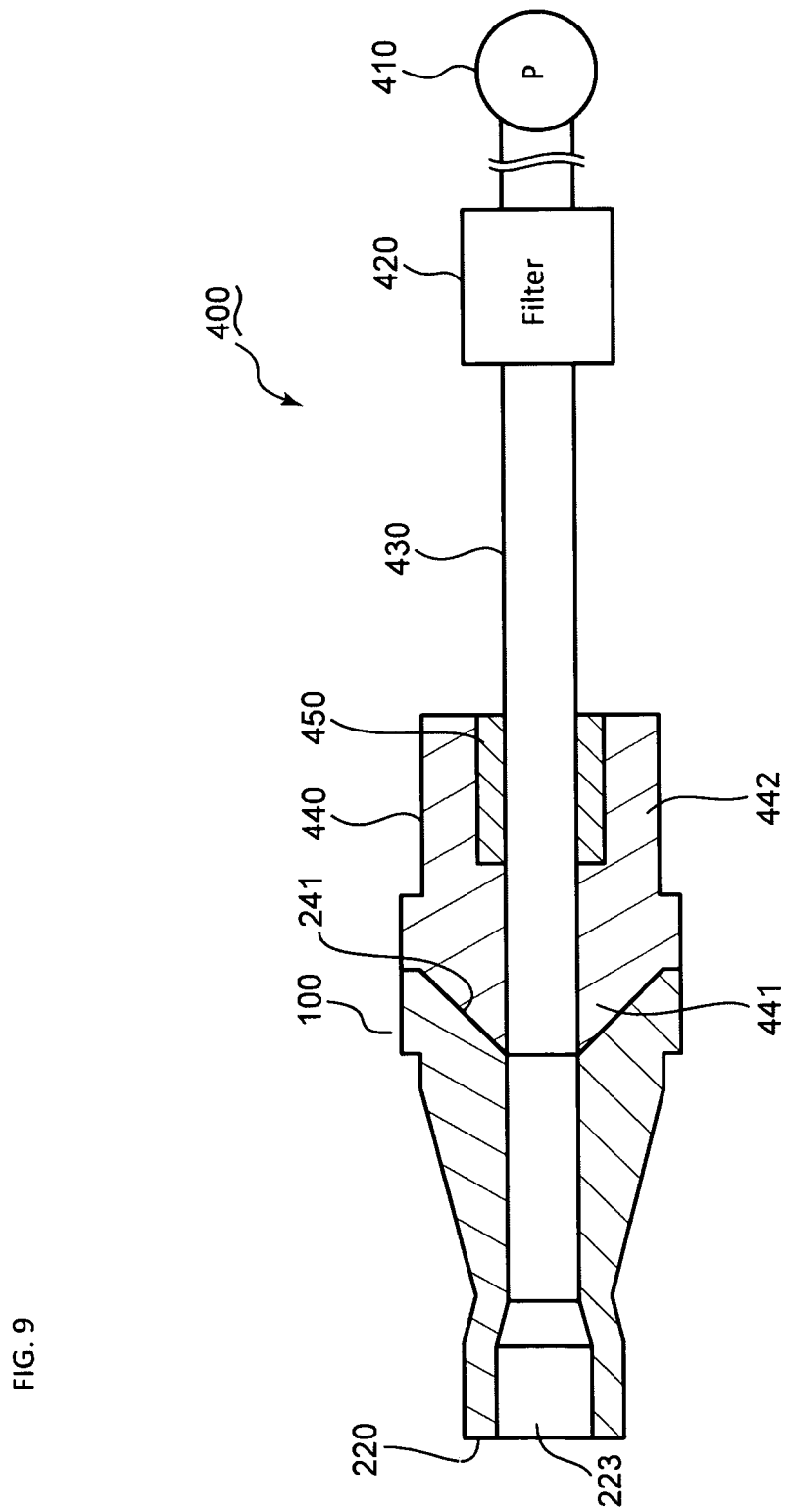
FIG. 9 is a schematic diagram of a desoldering tool according to the fourth embodiment.

FIG. 9 is a schematic view of a desoldering tool 400 of the fourth embodiment. Desoldering tool 400 is described with reference to FIG. 9.

Nozzle 100 is used as part of the desoldering tool 400. In addition to the nozzle 100 desoldering tool 400 comprises: a pump 410, a filter 420, a pipe 430, a cylindrical heating core 440, and a heater 450.

Heating core 440 includes a distal portion 441 and a proximal portion 442. Distal portion 441 is upraised toward the nozzle 100. Distal portion 441 is complementary to the space defined by the tapered inner surface 241 of the nozzle 100. The outer peripheral surface of the distal portion 441 maintains contact with the tapered inner surface 241.

Heater 450 is held by the proximal end 442. Since the outer peripheral surface of the distal portion 441 maintains contact with the tapered inner surface 241, the heat generated from the heater 450 is efficiently transferred from the heating core 440 to the nozzle 100.

Pipes 430, in cooperation with the heating core 440, define a suction path extending from the nozzle 100 to the pump 410. Pump 410 creates negative pressure in the suction path. Thus, the molten solder which was sucked from the opening 223 formed in the distal end surface 220 of the nozzle 100, flows through the suction path toward the pump 410. Filter 420 is disposed between the heating core 440 and the pump 410. Filter 420 captures the solder corning along the suction path. Pipe 430 is formed of a material having a high corrosion/erosion resistance to solder or other environmental factors. For example, stainless steel can be suitably used for the pipe 430.

The nozzle of the present invention may be formed from multiple members having different physical properties. In a fifth embodiment, an exemplary nozzle formed from two members is described.

Figure 10:
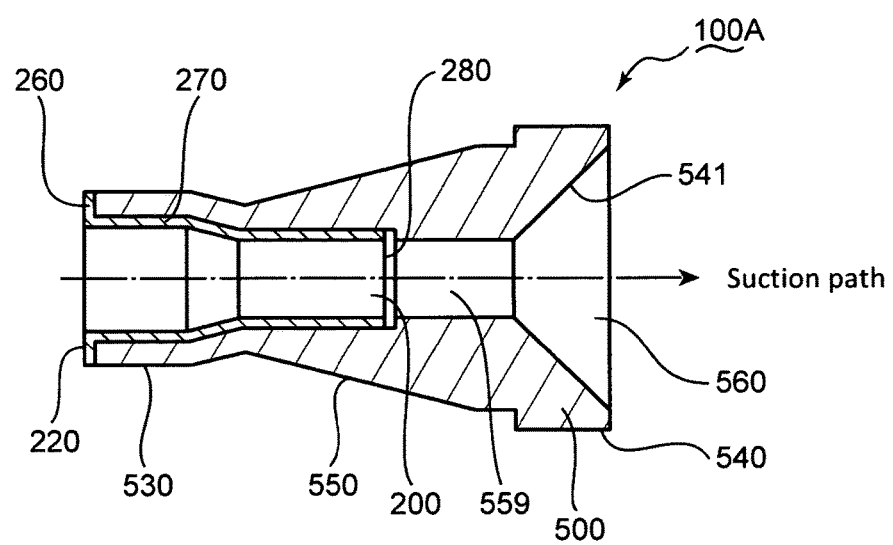
FIG. 10 is a schematic cross-sectional view of a nozzle of the fifth embodiment after the pressing step.

FIG. 10 is a schematic cross-sectional view of a nozzle 100A of the fifth embodiment. Referring to FIGS. 4, 9 and 10, the nozzle 100A is described. For the elements common to the first embodiment, the same reference numerals as in the first embodiment are assigned. The description of the first embodiment is incorporated for the elements with the same reference numerals.

Nozzle 100A includes a nozzle end member 200 and a nozzle base 500. The nozzle end member 200 is formed from a material having a higher corrosion/erosion resistance to solder as compared to the material of the nozzle base 500. Various materials such as iron, iron alloys, aluminum, aluminum alloy, stainless steel, titanium, carbon fibers, a composite material of carbon fiber and aluminum, a composite material of carbon fiber and aluminum alloy, may be used as a nozzle end member 200. The principle of this embodiment is not limited to particular material being used as the nozzle end member 200.

Nozzle base 500 is formed of a material having a higher thermal conductivity than the nozzle end member 200. Various materials such as copper or a copper alloy may be used to fabricate the nozzle base 500. The principle of this embodiment is not limited to particular material being used for the nozzle base 500.

The nozzle end member 200 includes an insertion body 270 and the distal end ring 260. Distal end ring 260 forms a distal end surface 220 described in connection with the first embodiment. While distal end ring 260 is exposed from the nozzle base 500, the insertion body 270 extending from the distal end ring 260 is surrounded by the nozzle base 500.

The nozzle end member 200 and the nozzle base 500 are both cylindrical. Nozzle base 500 cooperates with the nozzle end member 200 and defines a suction path.

Nozzle base 500 includes a distal barrel portion 530, a proximal barrel portion 540, and a tapered barrel portion 550. The distal barrel portion 530 and the tapered barrel portion 550 defines a hollow-opening 559 where the insertion body 270 of the nozzle end member 200 is inserted. After the insertion body 270 is inserted into hollow-opening 559, the distal barrel portion 530 is pressed together with the nozzle end member 200 in the pressing step (step 120) described with reference to FIG. 4, The proximal barrel portion 540 includes a tapered inner surface 541 defining a tapered space 560 narrowing toward the distal end surface 220. The tapered inner surface 541 may be in contact with the heating core 440 described with reference to FIG. 9.

The manufacture principles described above with respect to the second embodiment of the invention and the pressing step can be suitably used for the production of a nozzle that has been described in connection with the fifth embodiment. Unlike machining methods that rely on cutting or the like, a processing method by the pressing process may promote the heat transfer from the nozzle base to the nozzle end member, to uniformly surround the nozzle end member. Therefore, if the manufacturer is to manufacture the nozzle based on the production principle described in connection with the second embodiment, the temperature unevenness is less likely to occur on the distal end surface of the nozzle. As has been described in connection with the fifth embodiment, the pressing step is performed after bonding the nozzle end member and the nozzle base. Various techniques may be used for forming the integrated body of the nozzle end member and the nozzle base. In the sixth embodiment, an exemplary technique for forming the integrated body of nozzle end member and the nozzle base is described.

Figure 11:
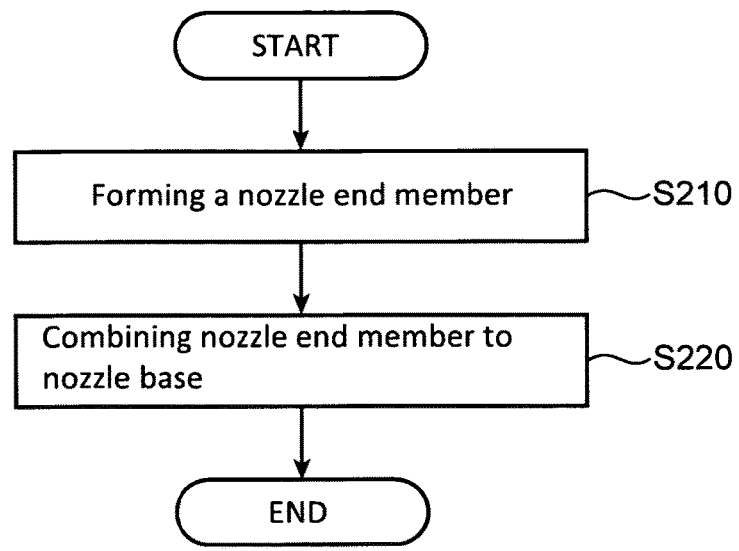
FIG. 11 is a schematic flow chart illustrating an exemplary procedure of forming a integration of the nozzle end member and the nozzle base of the nozzle shown in FIG. 10.
Figure 12:
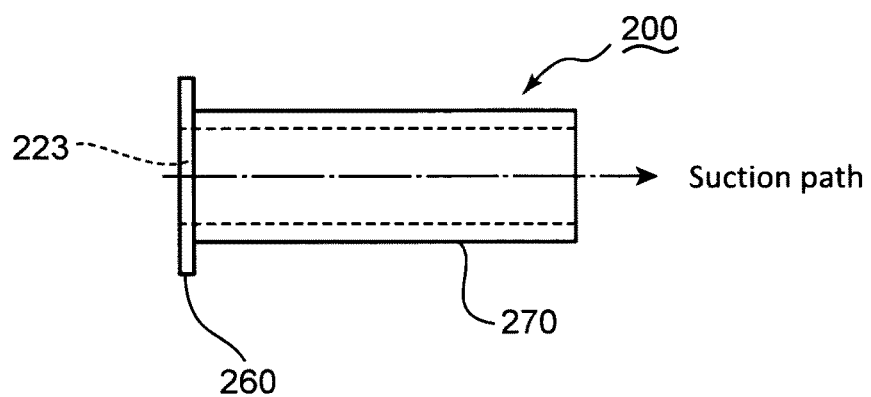
FIG. 12 is a schematic side view of the nozzle end member of the nozzle shown in FIG. 10 before the pressing step.
Figure 13:
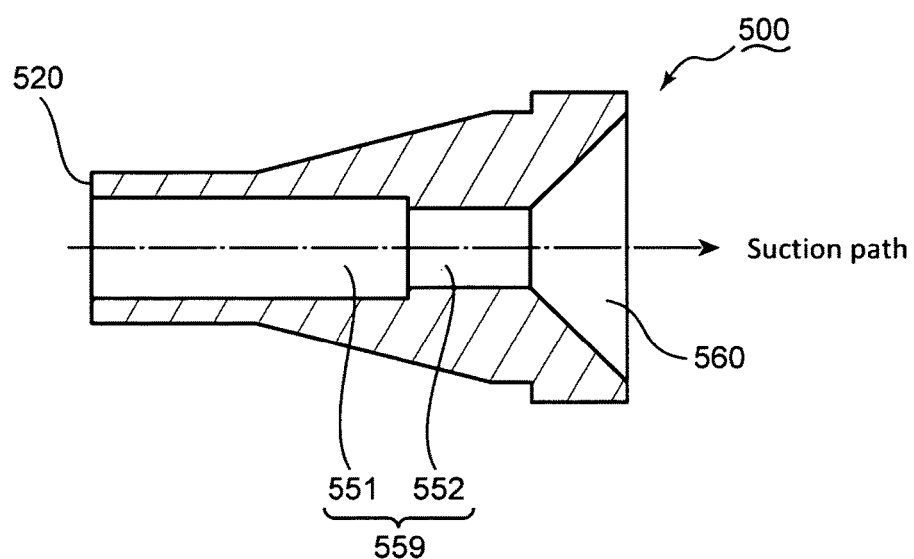
FIG. 13 is a schematic cross-sectional view of a nozzle base of the nozzle shown in FIG. 10 before the pressing step.

FIG. 11 is a schematic flowchart representing an exemplary procedure of forming an integrated body of the nozzle end member 200 and the nozzle base 500. FIG. 12 is a schematic side view of a nozzle end member 200 (before pressing step). FIG. 13 is a schematic cross-sectional view of a nozzle base 500 (before, pressing step). Referring to FIGS. 4, 10 to 13, the procedure to form the integrated body of the nozzle end member 200 and the nozzle base 500 is described.

Flowchart shown in FIG. 11 corresponds to step 110 which is described above with reference to FIG. 4.

In step 210, the manufacturer will machine process a material having high corrosion/erosion resistance to solder, for example, iron, iron alloys, aluminum, aluminum alloy, stainless steel, titanium, carbon fibers, a composite material of carbon fiber and aluminum, a composite material of carbon fiber and aluminum alloy, to form the nozzle end member 200 shown in FIG. 12. In the present embodiment, the first material may be exemplified by at least one of the material of iron, iron alloys, aluminum, aluminum alloy, stainless steel, titanium, carbon fibers, a composite material of carbon fiber and aluminum, a composite material of carbon fiber and aluminum alloy.

The outer peripheral surface of the distal end ring 260 of the nozzle end member 200 shown in FIG. 12 has a substantially circular outer contour. The inner peripheral surface of the distal end ring 260 defines a generally circular opening 223.

Insertion body 270 extends along the suction path from the distal end ring 260. While the outer diameter of the insertion body 270 is smaller than the outer diameter of the outer peripheral surface of the distal end ring 260, the inner diameter of the insertion body 270 substantially coincides with the inner diameter of the distal end ring 260.

In step 220, the manufacturer prepares the nozzle base 500 shown in FIG. 13. Nozzle base 500 may be formed by a machining process with a material with high thermal conductivity such as copper or a copper alloy. The principle of this embodiment is not limited to specific ways of obtaining the nozzle base 500. In the present embodiment, the second material may be exemplified by copper or a copper alloy.

Nozzle base 500 includes a distal end surface 520. When a nozzle end member 200 is inserted into the nozzle base 500, the distal end surface 520 of the nozzle base 500 abuts the distal end ring 260 of the nozzle end member 200.

A hollow-opening 559 of the nozzle base 500 includes a first section 551 and a second section 552. The first section 551 extends from the distal end surface 520 towards the tapering space 560 along the suction path. The second section 552 is formed between the first section 551 and a tapered space 560. The cross-sectional shape of the first section 551 is complementary to the cross-sectional shape defined by the outer peripheral surface of the insertion body 270 of the nozzle end member 200. The first section 551 may be slightly longer than the insertion body 270. Therefore, the manufacturer may insert the insertion body 270 into the first section 551 until the distal end ring 260 abuts the front end surface 520 of the nozzle base 500. Additionally, the manufacturer may braze process the boundary of the nozzle base 500 and the nozzle end member 200. Thus, the nozzle end member 200 is securely fixed to the nozzle base 500.

The length and diameter of the second section 552 may be determined to fit the outer diameter and length of the pipe (not shown) of the desoldering tool (not shown) to which nozzle 100A may be assembled. The principle of this embodiment is not limited to a particular shape of the second section 552.

Figure 14:
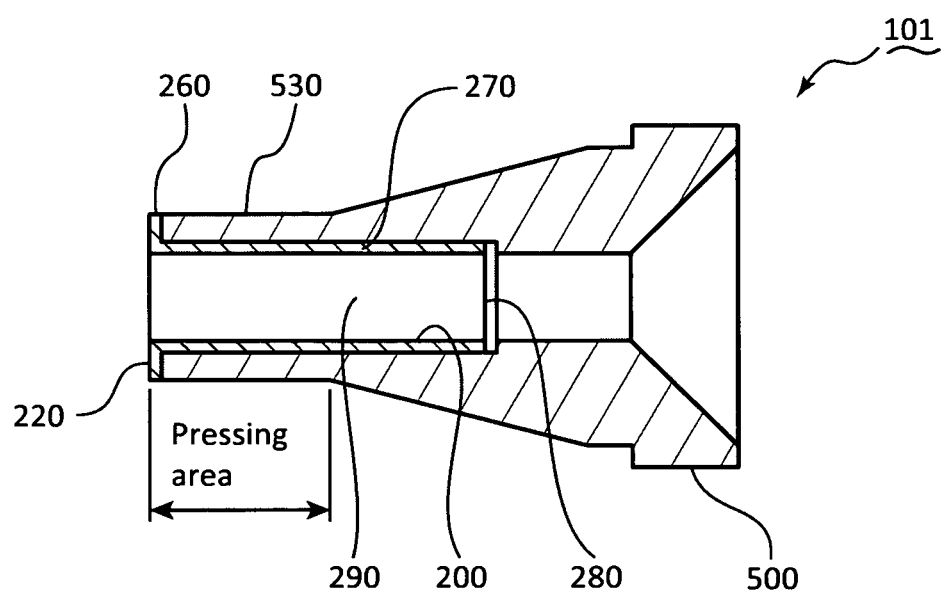
FIG. 14 is a schematic cross-sectional view of an integrated body obtained by forming procedure shown in FIG. 11 before the pressing step.

FIG. 14 is a schematic cross-sectional view of an integrated body 101 resulting from step 220 with reference to FIG. 11. The pressing process is explained with reference to FIGS. 4, 10, 11 and 14.

The pressing step 120 described with reference to FIG. 4 can be applied to the integrated body 101 comprising the nozzle end member 200 and the nozzle base 500. FIG. 14 shows the pressing section pressed in the pressing step. Pressing section is defined across the distal end ring 260 and all or a part of the distal barrel portion 530, a part of the insertion body 270. In the pressing process, when the pressing section is pressed, the nozzle 100A shown in FIG. 10 is formed.

After the pressing step, the distal end surface 220 and the outer surface of the periphery of the distal end surface 220 may be processed with solder plating. In other surface areas, coating such as chrome plating and aluminum diffusion coating may be applied. Consequently, the nozzle 100A may have a good workability and high corrosion resistance with respect to solder or other environmental factors.

The other end of the distal end face 220 of the nozzle end member 200 includes a proximal end portion 280. As shown in FIG. 14, the proximal end portion 280 is out from the pressing section. Since the proximal end portion 280 it is not pressed, the proximal end portion 280 defines a ring shape with a circular proximal end hole.

The cross-section of the pipe (not shown) of the desoldering tool (not shown) is generally circular. As described above, the proximal end portion 280 is possible to maintain a circular shape after the pressing step, to facilitate the connection between a tubular pipe of the desoldering tool and the nozzle end member 200.

For a nozzle end member formed from a material that is easily deformed, there is a possibility that the nozzle end member deforms during the process of coupling the nozzle end member and the nozzle base body. This results in poor production efficiency of the nozzle. In a seventh embodiment, a manufacturing method of a nozzle less unlikely to cause unintended deformation of the nozzle end member during manufacturing is described.

Figure 15:
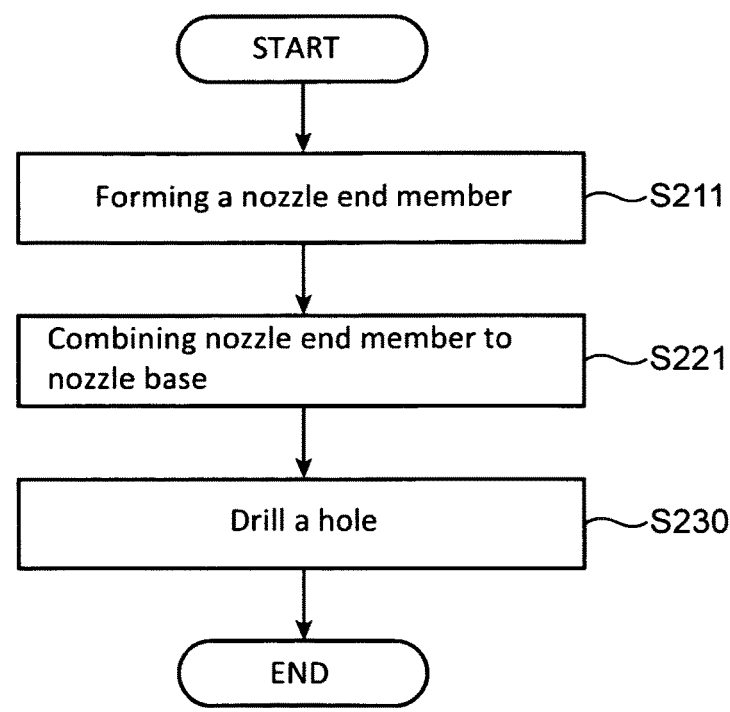
FIG. 15 is a schematic flow chart illustrating an exemplary procedure of forming an integrated body as shown in FIG. 14.
Figure 16:
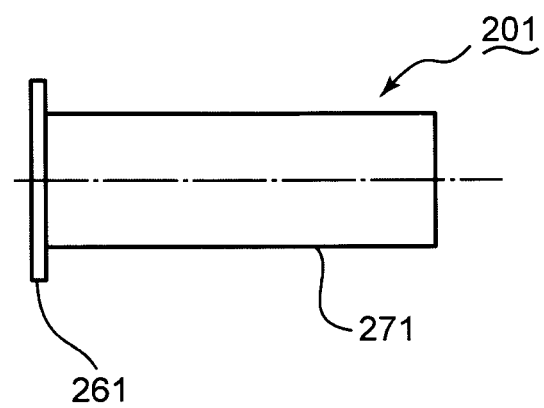
FIG. 16 is a schematic side view of the nozzle end member of the integrated body shown in FIG. 14.
Figure 17:
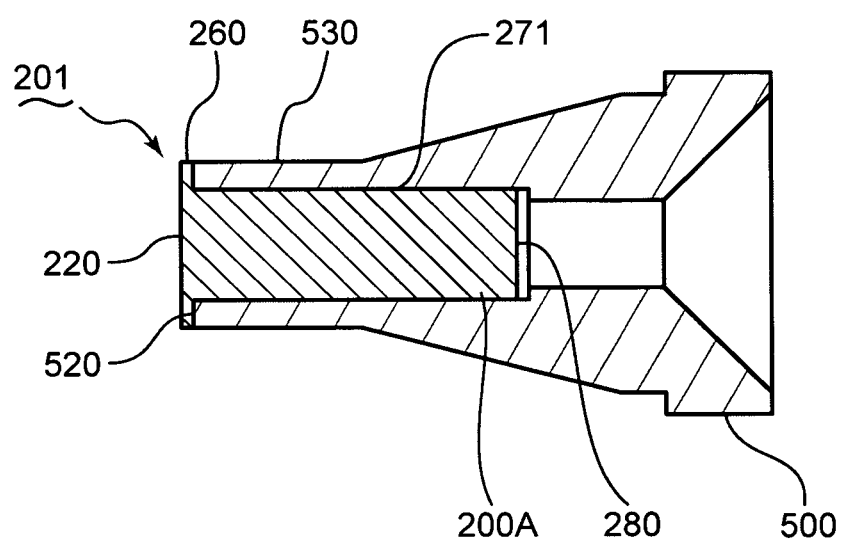
FIG. 17 is a schematic cross-sectional view of a nozzle base in which the nozzle end member in FIG. 16 is inserted.

FIG. 15 is a schematic flowchart representing an exemplary procedure of forming integrated body 101 (see FIG. 14). FIG. 16 is a schematic side view of a nozzle end member 201. FIG. 17 is a schematic cross-sectional view of a nozzle base 500 with the nozzle end member 201. Referring to FIG. 14 through FIG. 17, the procedure to manufacture an integrated body of the nozzle end member 200 and the nozzle base 500 is described.

In step 211, the manufacturer machines a material having high corrosion resistance to soldering, for example, iron, iron alloys, aluminum, aluminum alloy, stainless steel, titanium, carbon fibers, a composite material of carbon fiber and aluminum, a composite material of carbon fiber and aluminum alloy, to form the nozzle end member 201 shown in FIG. 16. In the present embodiment, the first material may be exemplified by at least one of iron, iron alloys, aluminum, aluminum alloy, stainless steel, titanium, carbon fibers, a composite material of carbon fiber and aluminum, a composite material of carbon fiber and aluminum alloy.

As shown in FIG. 16, the nozzle end member 201 includes a distal end portion 261 and an insertion body 271. The outer peripheral surface of the distal end portion 261 defines a substantially circular outer contour. Insertion body 271 is a cylinder extending from the tip 261. The outer diameter of the insertion body 271 is smaller than the outer diameter of the outer peripheral surface of the distal end portion 261. Unlike nozzle end member 201 described with reference to FIG. 12, the nozzle end member 201 obtained in step 211 is solid.

In step 221, the manufacturer inserts the insertion body 271 into the nozzle base 500, so the distal end portion 261 of the nozzle end member 201 abuts the distal end surface 520 of the nozzle base 500. As described above, since the nozzle end member 201 is solid, it is hard to deform during the processing of step S221. Therefore, the nozzle end member 201 may be press-fitted into the nozzle base 500.

At step 230, after the nozzle end member 201 is fitted to the nozzle base 500, the manufacturer performs a drilling process on the nozzle end member 201, forming a through-hole 290 extending from the distal end surface 220 to the proximal end portion 280 (see FIG. 14). Consequently, the integrated body 101 shown in FIG. 14 is formed.

As in the sixth embodiment, the manufacturer may perform a brazing process. The brazing process may be processed between the step 221 and step 230.

The nozzles described in connection with the fifth embodiment through the seventh embodiment are applicable to various desoldering devices. In an eighth embodiment, an exemplary desoldering device is described.

Figure 18:
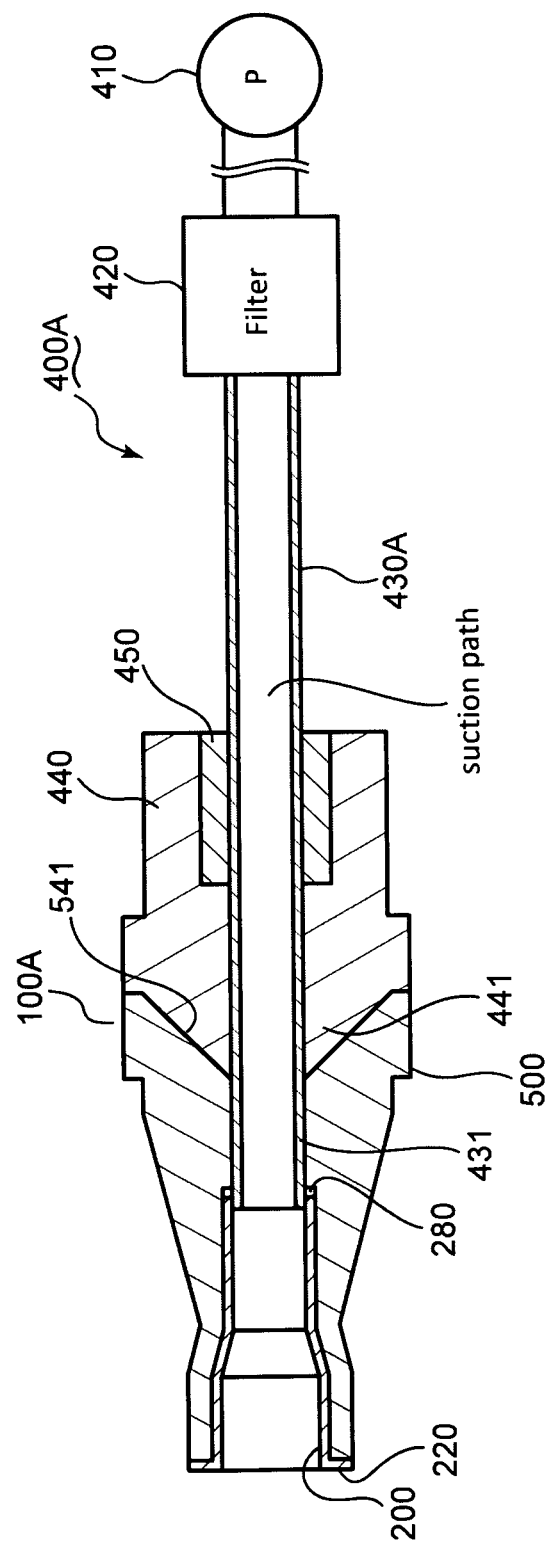
FIG. 18 is a schematic view of a desoldering tool of the eighth embodiment.

FIG. 18 is a schematic view of a desoldering tool 400A of the eighth embodiment. Desoldering equipment 400A will be described with reference to FIG. 18. For elements in common with the fourth embodiment or the fifth embodiment, the same reference numerals as in the fourth embodiment or the fifth embodiment are assigned. With respect to the description of the fourth embodiment and the fifth embodiment, the same reference numerals are incorporated for the elements with same reference numerals for the eighth embodiment.

Nozzle 100A is used as a part of the desoldering device 400A. As in the fourth embodiment, the desoldering tool 400A is provided with a pump 410, a filter 420, a tubular heating core 440, and a heater 450. The description of the fourth embodiment is incorporated for these elements.

Desoldering tool 400A further includes a pipe 430A. Pipe 430A includes a distal portion 431 that protrudes from the heating core 440 heated by the heater 450. Distal portion 431 is inserted into the nozzle 100A, connected to the proximal end 280 of the nozzle end member 200.

Pipe 430A is formed of a material having a high corrosion resistance to solder or other environmental factors. For example, stainless steel can be suitably used for the pipe 430A. Pipes 430A cooperates with the nozzle end member 200 and may cover the inner surface of the nozzle base 500. In this case, contact between solder and the nozzle base 500 is less likely to occur. Therefore, corrosion/erosion of the nozzle base 500 is less likely to occur.

The distal portion 441 of the heating core 440 contacts the tapered inner surface 541 of the nozzle base 500. Therefore, heat produced at the heater 450 is efficiently transmitted to the nozzle end member 200, through the heating core 440 and the nozzle base 500, The pump 410 reduces the pressure of the vacuum suction path defined by the nozzle 100A and pipe 430A. Therefore, the solder melted by the distal end surface 220 of the nozzle end member 200, moves toward the pump 410 through the suction path. Filter 420 disposed between the pump 410 and the heating core 440 captures the molten solder moving toward the pump 410. In this embodiment, the pressure reducing device is exemplified by the pump 410.

The nozzle may comprise a heater. In a ninth embodiment, an exemplary nozzle comprising a heater is described.

Figure 19:
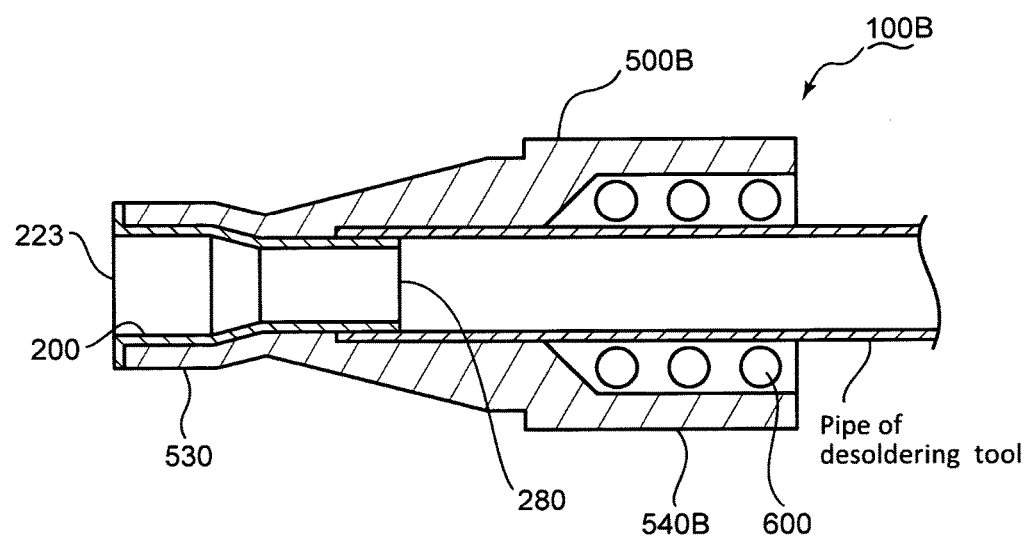
FIG. 19 is a schematic view of a nozzle of the ninth embodiment.

FIG. 19 is a schematic view of a nozzle 100B of the ninth embodiment. Nozzle 100B is described with reference to FIG. 19. For elements common to the fifth embodiment, the same reference numerals as in the fifth embodiment are assigned. The description of the fifth embodiment is incorporated for the elements with same reference numerals.

Nozzle 100B is manufactured by the manufacturing method described in connection with the sixth embodiment or the seventh embodiment. Like the fifth embodiment, the nozzle 100B is provided with a nozzle end member 200. The description of the fifth embodiment is incorporated to the nozzle end member 200.

Nozzle 100B is provided with a nozzle base 500B and a heater 600. Like the fifth embodiment, the nozzle base 500B includes a distal barrel portion 530. The description of the fifth embodiment is incorporated for the distal barrel portion 530.

FIG. 19 schematically illustrates a pipe of a desoldering device. Nozzle base 500B includes a proximal barrel portion 540B. Proximal barrel portion 540B surrounds the pipe. The heater 600 is disposed between the proximal barrel portion 540B and the pipe. Therefore, the heater 600 can heat the nozzle base 500B efficiently.

Nozzle 100B defines a thin annular gap on the outer periphery of the proximal end portion 280 of the nozzle end member 200. The end of the pipe of the desoldering tool is inserted into this thin gap. Therefore, a reliable suction route is formed from the opening 223 to the pipe.

Design principles described in connection with various embodiments described above are applicable to various nozzles. Some of the various features described in connection with one of the various embodiments described above may be applied to the nozzle described in relation to another embodiment.

The principle of the above embodiments can be suitably used in apparatus for removing solder. Although the present inventions have been described in certain specific embodiments, many additional modifications and variations would be apparent to those skilled in the art. It is therefore to be understood that these inventions may be practiced otherwise than as specifically described. Thus, the present embodiments of the inventions should be considered in all respects as illustrative and not restrictive, the scope of the inventions to be determined by any claims supportable by this application and the claims' equivalents rather than the foregoing description.

The invention claimed is:

1. A nozzle to be used in a desoldering tool which sucks solder, the nozzle comprising:
    a distal end surface suitable to be heated to a temperature to melt the solder, wherein said distal end surface defines a non-circular opening at an upstream end of the suction path of the molten solder and a circular opening at a downstream end of said nozzle said non-circular opening having a first dimension length measured along a first straight-line passing through a center of said opening, and having a second dimension width measured on a second straight-line perpendicular to the first straight-line, the second dimension width being less than the first length; and
    a nozzle end member including a distal end ring forming the distal end surface and an insertion body extending from said distal end ring wherein the insertion body includes a proximal end portion opposite of the distal end ring, the proximal end portion defining a proximal end hole having diameter greater than said width and less than said length of said non-circular opening; and
    a nozzle base formed with a hollow-opening to receive said insertion body, wherein, the nozzle base has a higher thermal conductivity than the nozzle end member, and the nozzle end member has a higher anti-corrosivity/erosivity than the nozzle base.

2. The nozzle according to claim 1, wherein:
    the distal end surface including an inside edge defining the opening; and
    the inside edge including a pair of straight edges separated by the width distance between the pair of straight edges, and a pair of curved edges connecting the ends of the pair of straight edges.

3. The nozzle according to claim 2, wherein the curved edges are curved away from the center of said non-circular opening.

4. The nozzle according to claim 1, further comprising:
    an outer surface coating on said nozzle, said outer surface coating material selected from the group consisting of solder plating, chrome plating and aluminum diffusion coating.

5. The nozzle according to claim 1 wherein said nozzle end member is formed from a material selected from the group consisting of iron, iron alloys, aluminum, aluminum alloy, stainless steel, titanium, carbon fibers, a composite material of carbon fiber and aluminum, a composite material of carbon fiber and aluminum alloy.

6. The nozzle according to claim 1 wherein said nozzle base is formed from a material selected from the group consisting of copper and copper alloys.

7. The nozzle according to claim 1 wherein said nozzle end member is formed from a material selected from the group consisting of iron, iron alloys, aluminum, aluminum alloy, stainless steel, titanium, carbon fibers, a composite material of carbon fiber and aluminum, a composite material of carbon fiber and aluminum alloy and said nozzle base is formed from a material selected from the group consisting of copper and copper alloys.

8. The nozzle according to claim 7 wherein said nozzle end member is secured to said nozzle base by brazing, press fitting, or chemical bonding.

9. A method to manufacture a nozzle used in a desoldering tool to suck solder, comprising:
   a first manufacturing step to prepare a nozzle blank having a distal end surface with a circular opening formed therein; and
   a second manufacturing step to press said distal end of said nozzle blank to deform the circular opening to a non-circular opening.

10. The method according to claim 9, wherein said step to prepare a nozzle blank includes:
   (i) a step to form a nozzle end member having a distal end portion forming said distal end surface and an insertion body extending from said distal end portion, the nozzle end member formed from a first material;
   (ii) a step to insert said insertion body into a nozzle base, the nozzle base formed from a second material having higher thermal conductivity than the first material of said nozzle end member, the material of said nozzle base also having lower anti-corrosivity/erosivity than the first material of said nozzle end member.

11. The method according to claim 10, wherein said step to prepare a nozzle includes a step to form said circular opening by boring, drilling or milling a through hole penetrating said distal end portion and said insertion body.

12. The method according to claim 10, wherein said step to press the distal end surface includes a step to integrally press said distal end portion and a part of said insertion body.

13. The method according to claim 11, wherein said step to press the distal end surface includes a step to integrally press said distal end portion and a part of said insertion body.

14. The method according to claim 10 further comprising the step of forming said nozzle end member from a material selected from the group consisting of iron, iron alloys, aluminum, aluminum alloy, stainless steel, titanium, carbon fibers, a composite material of carbon fiber and aluminum, a composite material of carbon fiber and aluminum alloy and forming said nozzle base from a material selected from the group consisting of copper and copper alloys.

15. The method according to claim 14 further comprising the step of coating outer surfaces of said nozzle using a solder plating, chrome plating or aluminum diffusion coating process.

16. A method to manufacture a nozzle used in a desoldering tool to suck solder, comprising:
   (i) a step to form a nozzle end member having a distal end portion forming a distal end surface and an insertion body extending from said distal end portion, the nozzle end member formed from a first material;
   (ii) a step to form a nozzle base, the nozzle base formed from a second material having higher thermal conductivity than the first material of said nozzle end member, said nozzle base having an axial opening dimensioned to receive said insertion body portion of said nozzle end member;
   (iii) a step to insert said insertion body into said axial opening of said nozzle base to form a composite nozzle.

17. The method according to claim 16, wherein said step to form said nozzle end member forms a solid cylinder insertion body portion and after said step of inserting said insertion body into said nozzle base a step to form an opening through said nozzle end member by boring, drilling or milling a through hole penetrating through and said insertion body.

18. The method according to claim 16 further comprising the step of forming said nozzle end member from a material selected from the group consisting of iron, iron alloys, aluminum, aluminum alloy, stainless steel, titanium, carbon fibers, a composite material of carbon fiber and aluminum, a composite material of carbon fiber and aluminum alloy and forming said nozzle base from a material selected from the group consisting of copper and copper alloys.

19. The method according to claim 18 further comprising the step of coating outer surfaces of said nozzle using a solder plating, chrome plating or aluminum diffusion coating process.

20. The method according to claim 16, further comprising the steps of:
   forming a jig including a holding block and a fixing block;
   placing said composite nozzle into said jig between said holding block and said fixing block; and
   deforming a distal end of said composite nozzle using a press to shape the distal end of said composite nozzle into an elongated oval.

21. The method according to claim 18 further comprising the step of brazing the boundary of said nozzle base and said nozzle end member to securely fix said nozzle base to said end member.

22. The method according to claim 17, further comprising the steps of:
   forming a jig including a holding block and a fixing block;
   placing said composite nozzle into said jig between said holding block and said fixing block; and
   deforming a distal end of said composite nozzle using a press to shape the distal end of said composite nozzle into an elongated oval.

23. The method according to claim 22 further comprising the step of coating outer surfaces of said nozzle using a solder plating, chrome plating or aluminum diffusion coating process.

* * * * *